United States Patent
Tsuji et al.

[11] Patent Number: 5,896,664
[45] Date of Patent: Apr. 27, 1999

[54] PROCESS FOR PRODUCING ALUMINUM ALLOY BEARING

[75] Inventors: Hideo Tsuji; Hideo Ishikawa; Yasuo Ido; Takayuki Shibayama, all of Nagoya, Japan

[73] Assignee: Daido Metal Company Ltd., Nagoya, Japan

[21] Appl. No.: 08/969,696

[22] Filed: Nov. 13, 1997

[30] Foreign Application Priority Data

Dec. 10, 1996 [JP] Japan ..................... 8-352027

[51] Int. Cl.$^6$ ........................................ B23P 15/00
[52] U.S. Cl. ................... 29/898.14; 134/3; 134/41; 216/103
[58] Field of Search ................ 29/898.13, 898.12, 29/898.14; 156/629.1, 630.1, 634.1, 656.1; 216/103, 33, 102; 134/3, 41

[56] References Cited

U.S. PATENT DOCUMENTS

| | | | |
|---|---|---|---|
| 4,608,275 | 8/1986 | Kukanskis et al. | 427/98 |
| 4,857,225 | 8/1989 | Terada et al. | 252/100 |
| 5,116,692 | 5/1992 | Mori et al. | 428/650 |
| 5,259,979 | 11/1993 | Condra et al. | 252/79.2 |
| 5,648,125 | 7/1997 | Cane | 427/534 |
| 5,669,980 | 9/1997 | McNeil et al. | 134/3 |

FOREIGN PATENT DOCUMENTS 7-233490  9/1995  Japan .

*Primary Examiner*—S. Thomas Hughes
*Assistant Examiner*—Marc W. Butler
*Attorney, Agent, or Firm*—Browdy and Neimark

[57] ABSTRACT

In producing an aluminum alloy bearing which comprises bonding an aluminum alloy layer to a backing metal layer composed of steel and then coating an intermediate layer and an overlay in this order on the surface of the aluminum alloy layer of the resulting semi-finished product, the surface of the aluminum alloy layer of the semi-finished product is subjected to etching treatment and the smut attached to the said surface is removed by subjecting the etched semi-finished product to de-smutting treatment using, as a de-smutting solution, an aqueous solution comprising 20 to 60% by weight of sulfuric acid and 2 to 10% by weight of a peroxoborate, whereby the tolerance of the bearing height is made small, the working environment is rendered good and the draining treatment is made easy.

2 Claims, 3 Drawing Sheets

PROCESS FOR PRODUCING ALUMINUM ALLOY BEARING

BACKGROUND OF THE INVENTION

This invention relates to a process for producing an aluminum alloy bearing which comprises bonding an aluminum alloy layer to a backing metal layer composed of steel and further coating the surface of the aluminum alloy layer with a dam layer and an overlay In particular, it relates to a de-smutting treatment to be carried out in the middle of the course of the above production process, by which treatment, the smut is removed which remains on the surface of the aluminum alloy layer after the surface of the aluminum alloy layer has been etched for enhancing the adhesive force of the intermediate layer of a half-finished product in which the aluminum alloy layer is bonded to the backing metal layer.

As an aluminum alloy bearing 1, there has been broadly known one obtained by bonding an aluminum alloy layer 12 to a backing metal layer 11 and further applying an intermediate layer 13 and an overlay 14 to the internal surface of the aluminum alloy layer 12 by plating as shown in FIG. 1 of the accompanying drawings.

These aluminum alloy bearings 1 are explained below referring to a semi-cylindrical half bearing 1a as shown in FIG. 2 of the accompanying drawings. Two half bearings 1a are assembled as one set in the cylindrical internal surface of a housing 20 and support a rotating shaft 21 so that the shaft can be freely rotated. In this case, such difficulties are caused that when the peripheral length of the bearing is longer than the length of the internal periphery of the housing 20, the bearing is greatly deformed to the inside, and when it is contrarily shorter, the position of the bearing is shifted during the sliding, whereby it becomes impossible that the bearing smoothly supports the rotating shaft 21. Therefore, the dimensional tolerance of the external diameter of the half bearing 1a to the internal diameter of the housing 20 is required very critically.

For example, as to a bearing having an internal diameter of 40 to 80 mm, JIS D3102 defines the tolerance of the height H of the bearing as within 0.04 mm. The height H of this bearing, as shown in FIG. 3, becomes the external surface radius of the half bearing 1a when this half bearing is contained in the concave of the semi-circular arc shape of a cylindrical measuring jig 31 having the given diameter and pressed at the given pressure P by means of a press plate from one side.

In the process for producing such an aluminum alloy bearing, the aluminum alloy layer 12 is bonded to the backing metal layer 11 and the resulting laminate is cut to a ribbon shape, and this ribbon-shaped plate is subjected to bend forming to a half cylinder shape, thereby obtaining a semi-finished product 10 as shown in FIG. 4 of the accompanying drawings. Thereafter, the internal surface of the semi-finished product 10 is coated with an intermediate layer 13 and an overlay 14 in this order as shown in FIG. 1 by a plating method.

In the above production process, for the purpose of enhancing the adhesive force between the aluminum alloy layer 12 and the intermediate layer 13, an etching treatment is conducted for dissolving and removing oxides and the like formed on the surface of the aluminum alloy layer 12 as a preliminary step before forming the intermediate layer 13 on the aluminum alloy layer 10 by plating. The etching treatment is effected by immersing the semi-finished product in an alkali solution. However, insolubles (smut) such as copper, silicon and the like which are the added elements in the aluminum alloy layer 12 are attached to and remain on the surface of the aluminum alloy layer, and a de-smutting treatment is subsequently conducted for removing the insolubles remaining on the surface.

The de-smutting treatment is conducted by contacting the semi-finished product with a de-smutting solution. As the de-smutting solution, an aqueous solution comprising a combination of an acid and an oxidizing agent has heretofore been used, and a de-smutting solution composed of a combination of sulfuric acid and bichromic acid, a combination of nitric acid and hydrofluoric acid, or the like has been generally used.

Since in the de-smutting treatment, not only the aluminum alloy layer but also the backing metal has been contacted with the de-smutting solution, when a de-smutting solution composed of a combination of sulfuric acid and bichromic acid, a combination of nitric acid and hydrofluoric acid or the like has been used, even the backing metal has been corroded simultaneously with the removal of the smut. When the backing metal 11 has been corroded to be made thin, the bearing height H has been decreased and the variation of dimension has become large.

Moreover, JP-A 7(1995)-233,490 discloses the use of a mixed aqueous solution of phosphoric acid and nitric acid as the de-smutting solution and states that the corrosion of the backing metal by the de-smutting treatment can be inhibited. Furthermore, it states that by adding a nitrogen-containing organic compound such as urea or the like, the generation of nitrous acid gas is inhibited, whereby the deterioration of the working environment can be prevented.

Recently, even in the production of a bearing, various measures have been taken from the viewpoint of preventing the deterioration of working environment and the generation of environmental pollution.

The conventional de-smutting solution composed of a combination of sulfuric acid and bichromic acid, a combination of nitric acid and hydrofluoric acid or the like has caused a large corrosion of the backing metal, and, in addition, when bichromic acid is used as an oxidizing agent, it has been necessary to remove chromium (VI) compounds and thereafter drain water. Furthermore, when nitric acid is used, it is necessary to prevent the deterioration of the working environment due to the generation of nitrous acid gas.

It is also stated that the de-smutting solution composed of the mixed solution of phosphoric acid and nitric acid disclosed in JP-A 7(1995)-233,490, when used in combination with a nitrogen-containing organic compound, can prevent the generation of nitrous acid gas. However, since nitrogen and phosphorus are contained, it has such a problem that waste management is required to be sufficiently effected. Moreover, phosphoric acid is generally expensive, and hence, in the above technique in which a large amount of phosphoric acid is used, there is such a fear that the product may become high in cost

SUMMARY OF THE INVENTION

This invention, therefore, aims at providing a process for producing an aluminum alloy bearing in which process the corrosion of backing metal is small, the working environment is good and the draining treatment is easy because the de-smutting treatment is effected using a de-smutting solution comprising sulfuric acid and a peroxoborate.

According to this invention, there is provided a process for producing an aluminum alloy bearing, which comprises bonding an aluminum alloy layer to a backing metal layer composed of steel to form a semi-finished product and further coating an intermediate layer and an overlay in this order on the surface of the aluminum alloy layer of the semi-finished product, wherein the surface of the aluminum alloy layer of the semi-finished product is subjected to etching treatment and thereafter the etched semi-finished product is subjected to de-smutting treatment for removing the smut attached to the surface of the aluminum alloy layer using, as a de-smutting solution, an aqueous solution comprising 20 to 60% by weight of sulfuric acid and 2 to 10% by weight of a peroxoborate.

BRIEF DESCRIPTION OF THE DRAWINGS

In FIGS. 1 to 4, 1 refers to an aluminum alloy bearing, 11 to a backing metal layer, 12 to an aluminum alloy layer, 13 to a dam layer, and 14 to an overlay

DETAILED DESCRIPTION OF THE INVENTION

Figure 1:
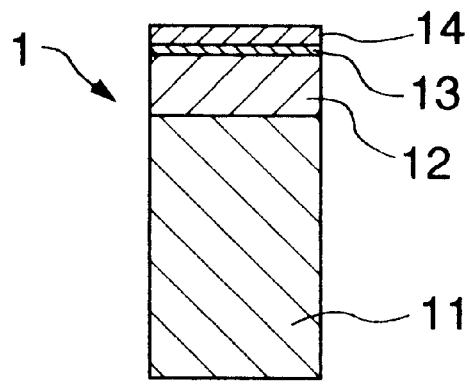
FIG. 1 is an enlarged view of a part of an aluminum alloy bearing
Figure 2:
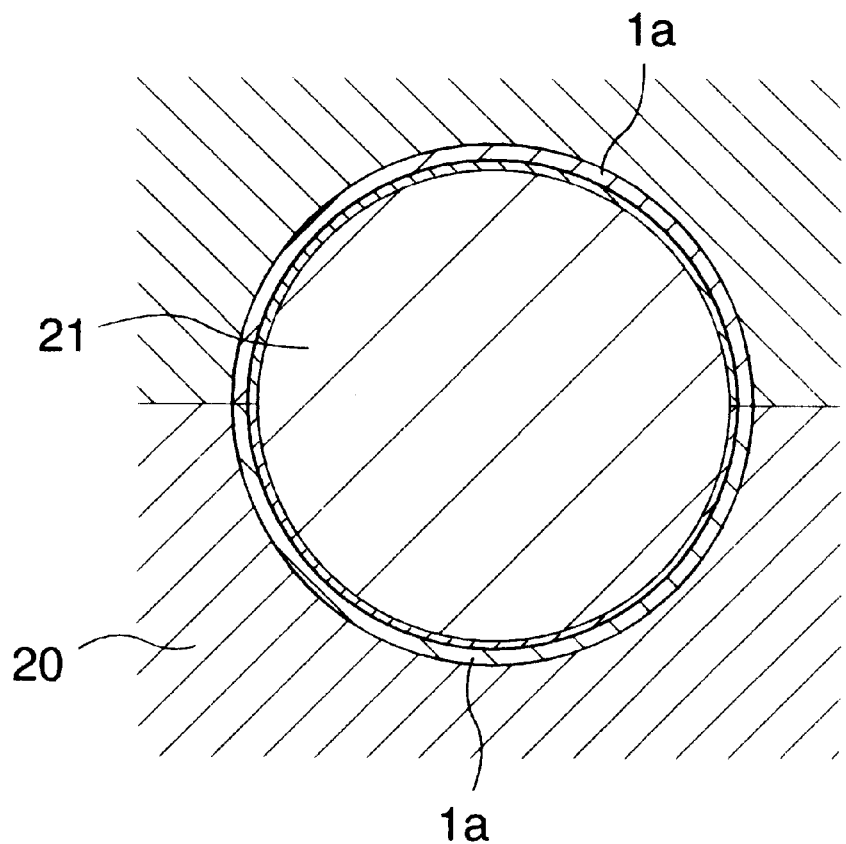
FIG. 2 is a sectional view for explaining an assembled state in a housing
Figure 3:
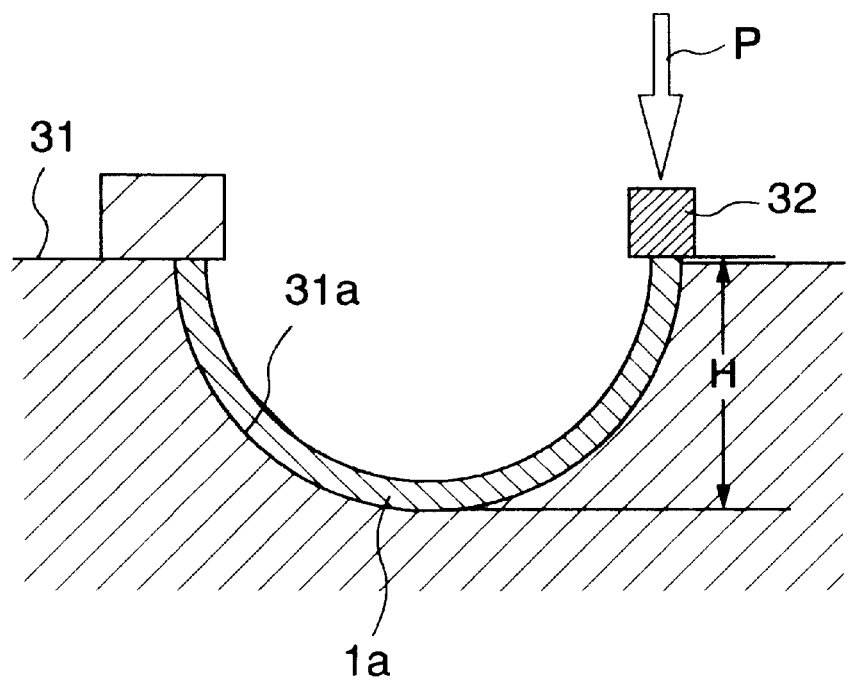
FIG. 3 is an explanatory view of a method of measuring the bearing height H.

The de-smutting solution is an aqueous solution comprising sulfuric acid and a peroxoborate. In addition to the peroxoborate, there can be used a peroxocarbonate, a peroxosulfate and the like; however, sodium perborate which is one of a peroxoborate is particularly preferable in view of stability.

The sulfuric acid concentration of the de-smutting solution is 20 to 60% by weight When the sulfuric acid concentration is less than 20% by weight, the smut remains On the other hand, when the sulfuric acid concentration is more than 60% by weight, the dissolvability of the peroxoborate becomes low. Considering them, a sulfuric acid concentration of 30 to 40% by weight is particularly preferable.

The peroxoborate concentration is 2 to 10% by weight When the peroxoborate concentration is less than 2% by weight, the smut remains. On the other hand, when the peroxoborate concentration exceeds 10% by weight, the backing metal is corroded Therefore, the peroxoborate concentration is 2 to 10% by weight, preferably 3 to 8% by weight.

The de-smutting solution is not necessarily heated or cooled, and the de-smutting treatment can be effected at room temperature However, it is preferable to effect the de-smutting treatment at a temperature within the range of from 10° C. to 50° C.

Moreover, the de-smutting treatment time is preferably 30 to 300 seconds in relation to the temperature of the de-smutting solution.

The smut attached to and remaining on the surface of an aluminum alloy layer is removed by the de-smutting treatment In this case, the backing metal layer is also slightly corroded and the amount of the backing metal layer corroded is as small as several microns in terms of the bearing height.

As the de-smutting treatment proceeds, the peroxoborate is decomposed into harmless boric acid. In addition, since sulfuric acid is used as an acid, the generation of a harmful nitrogen oxide gas or the like is inhibited and the working environment is not deteriorated. Moreover, the waste liquid can be neutralized to be made harmless.

The semi-finished product which has been subjected to the de-smutting treatment, is washed with water and thereafter subjected to electric plating, whereby an intermediate layer and an overlay are formed on the aluminum alloy layer.

As explained above, after the surface of the aluminum alloy layer of the semi-finished product has been subjected to etching treatment, the smut attached to the surface of the aluminum alloy layer is removed by the de-smutting treatment with a de-smutting solution composed of an aqueous solution comprising 20 to 60% by weight of sulfuric acid and 2 to 10% by weight of a peroxoborate, whereby the corrosion of the backing metal can be inhibited sufficiently, and consequently, the variation of the bearing height can be controlled. In addition, according to the above de-smutting treatment, the working environment can be maintained good and the draining treatment can be made easy.

DESCRIPTION OF PREFERRED EMBODIMENTS

This invention is explained below in more detail based on Examples and Comparative Examples.

EXAMPLES 1 TO 3 AND COMPARATIVE EXAMPLES 1 TO 5

Figure 4:
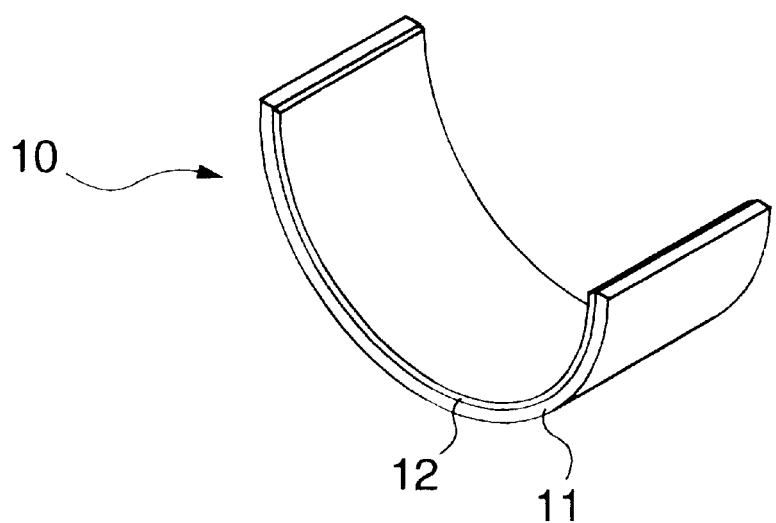
FIG. 4 is a perspective view of a semi-finished product

A semi-finished product 10 as shown in FIG. 4 was prepared by bonding an aluminum alloy (Sn 12% by weight, Si 2.5% by weight and Cu 0.5% by weight) sheet having a thickness of 0.3 mm as the aluminum alloy layer 12 to a steel plate (SPCC) having a thickness of 1.5 mm as the backing metal layer 11, cutting the resulting laminate to a ribbon shape of 25 mm in width and 110 mm in length and then subjecting this ribbon-shaped laminate to bend forming to prepare a semi-cylinder having an external diameter of 70 mm. Twenty test samples of the semi-finished product 10 thus produced were used in each of the Examples and the Comparative Examples.

The test sample was immersed in a degreasing agent to degrease the test sample and thereafter immersed in a 10 g/liter aqueous sodium hydroxide solution as an etching solution at a liquid temperature of 50° C. for 2 minutes to etch the test sample. Subsequently, the thus etched test sample was washed with water and dried, after which the bearing height H of this semi-finished product was measured. This bearing height is referred to hereinafter as the bearing height before de-smutting treatment $H_1$.

Subsequently, the semi-finished product which had been subjected to measurement of bearing height H was subjected to de-smutting treatment. The de-smutting treatment was conducted in a bath containing, as shown in Table 1, an aqueous solution comprising 20 to 60% by weight of sulfuric acid and 2 to 10% by weight of sodium perborate in Examples 1 to 3, a mixture of bichromic acid and sulfuric acid in Comparative Example 1, a mixture of hydrofluoric acid and nitric acid in Comparative Example 2 and a mixture of phosphoric acid and nitric acid in Comparative Example 3, as a de-smutting solution. In Comparative Example 4, an aqueous solution comprising 10% by weight of sulfuric acid and 4% by weight of sodium perborate was used and, in Comparative Example 5, an aqueous solution comprising 50% by weight of sulfuric acid and 1% by weight of sodium perborate was used, as a de-smutting solution.

TABLE 1

|   |   | Composition of de-smutting solution (wt. %) |   | Temp. of treating soln. (° C.) | Treating time (sec) |
|---|---|---|---|---|---|
| Example | 1 | Sulfuric acid<br>Sodium perborate | 30<br>4 | 20 | 120 |
|  | 2 | Sulfuric acid<br>Sodium perborate | 30<br>8 | 20 | 120 |
|  | 3 | Sulfuric acid<br>Sodium perborate | 50<br>4 | 20 | 120 |
| Comparative Example | 1 | Sulfuric acid<br>Bichromic acid | 20<br>3 | 20 | 120 |
|  | 2 | Nitric acid<br>Hydrofluoric acid | 20<br>2 | 20 | 120 |
|  | 3 | Nitric acid<br>Phosphoric acid | 20<br>70 | 20 | 120 |
|  | 4 | Sulfuric acid<br>Sodium perborate | 10<br>4 | 20 | 120 |
|  | 5 | Sulfuric acid<br>Sodium perborate | 50<br>1 | 20 | 120 |

The de-smutting treatment was conducted at a bath temperature of 20° C. for an immersion time of 20 minutes. After the semi-finished product was taken out of the de-smutting solution, it was washed with water and dried. In each of the Examples and the Comparative Examples, the bearing height H of the test sample after the de-smutting treatment was measured, and this height is referred to hereinafter as the bearing height $H_2$. From the bearing heights before and after the de-smutting treatment, the amount of bearing height decreased [$\Delta H (H_1 - H_2)$] variation thereof were determined. These results are shown in Table 2 and FIG. 5.

TABLE 2

|   |   | Remaining smut | $\Delta H (H_1 - H_2)$ ($\mu$m) | Variation of $\Delta H$ ($\mu$m) |
|---|---|---|---|---|
| Example | 1 | Nothing | 5 | 2–10 |
|  | 2 | Nothing | 6 | 2–12 |
|  | 3 | Nothing | 5 | 2–10 |
| Comparative | 1 | Nothing | 17 | 10–27 |
|  | 2 | Nothing | 20 | 10–31 |
| tive | 3 | Nothing | 11 | 6–20 |
| Example | 4 | Remained | 6 | 2–10 |
|  | 5 | Remained | 6 | 2–9 |

In Examples 1 to 3 and Comparative Examples 1 to 3, the smut was sufficiently removed from the surface of the aluminum alloy layer. On the other hand, in Comparative Examples 4 and 5, the smut remained.

Figure 5:
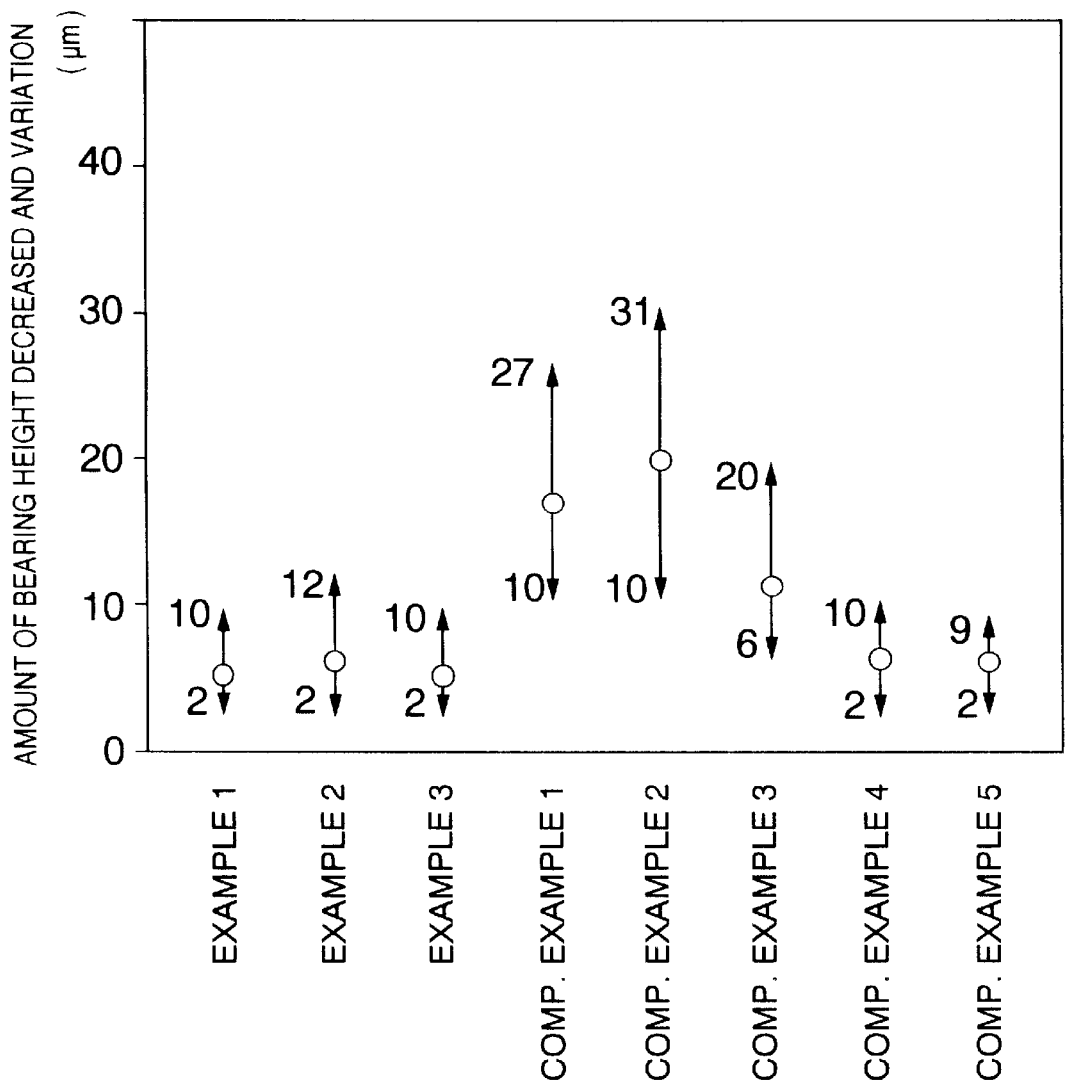
FIG. 5 is a graph for showing the amount of the bearing height decreased and variation thereof.

As shown in Table 2 and FIG. 5, in Comparative Examples 1 and 2, the amounts of bearing height decreased were as large as 17 and 20 $\mu$m, respectively, and the thereof were as large as about 10 $\mu$m to about 31 $\mu$m In Comparative Example 3, the amount of bearing height decreased was 11 $\mu$m and the variation thereof was 6 to 20 $\mu$m, and these were improved as compared with those in Comparative Examples 1 and 2. In Examples 1 to 3, greatly improved results of the amount of bearing height decreased and variation thereof were also obtained as compared with those in Comparative Example 3.

What is claimed is:

1. A process for producing an aluminum alloy bearing which comprises bonding a first surface of an aluminum ally layer to a backing metal layer composed of steel to provide a semi-finished product, and then coating an intermediate layer and an overlay in this order on a second surface of the aluminum alloy layer of the semi-finished product, wherein prior to said coating the second surface of the aluminum alloy layer, the semi-finished product is subjected to an etching treatment and thereafter the etched semi-finished product is subjected to a de-smutting treatment for removing smut attached to the second surface of the aluminum alloy layer using, as a de-smutting solution, an aqueous solution comprising 20 to 60 weight of sulfuric acid and 2 to 10 % by weight of a peroxoborate.

2. The process for producing an aluminum alloy bearing according to claim 1, wherein the peroxoborate is sodium perborate.

* * * * *